United States Patent
Lim et al.

(10) Patent No.: US 12,172,556 B2
(45) Date of Patent: Dec. 24, 2024

(54) DEVICE FOR ADJUSTING POSITION OF SEAT FOR VEHICLE

(71) Applicants: HYUNDAI MOTOR COMPANY, Seoul (KR); KIA CORPORATION, Seoul (KR)

(72) Inventors: Deok Soo Lim, Hwaseong-si (KR); Sang Do Park, Suwon-si (KR); Bong Ku Kim, Seoul (KR); Sang Hark Lee, Incheon (KR); Jun Hwan Lee, Seoul (KR); Dong Hoon Keum, Busan (KR); Chan Ho Jung, Gunpo-si (KR); Sang Soo Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 233 days.

(21) Appl. No.: 17/948,501

(22) Filed: Sep. 20, 2022

(65) Prior Publication Data

US 2023/0092189 A1 Mar. 23, 2023

(30) Foreign Application Priority Data

Sep. 23, 2021 (KR) .......................... 10-2021-0125498

(51) Int. Cl.
*B60N 2/30* (2006.01)
*A47C 1/126* (2006.01)
(Continued)

(52) U.S. Cl.
CPC ............ *B60N 2/3015* (2013.01); *A47C 1/126* (2013.01); *A47C 9/06* (2013.01); *B60N 2/0155* (2013.01); *B60N 2/1695* (2013.01); *B60N 2/3047* (2013.01); *B60N 2/3097* (2013.01); *B60N 2/995* (2018.02); *B60N 2/34* (2013.01)

(58) Field of Classification Search
CPC .... B60N 2/3015; B60N 2/3047; B60N 2/995; B60N 2/0155; B60N 2/1695; B60N 2/01508; B60N 2/3097; B60N 2/015; B60N 2/01558; B60N 2/24; B60N 3/063;
(Continued)

(56) References Cited

U.S. PATENT DOCUMENTS

| 895,632 A | * | 8/1908 | Harris | ................... | B60N 3/063 |
| | | | | | 296/75 |
| 2,497,412 A | * | 2/1950 | Larin | ...................... | A47C 9/06 |
| | | | | | 297/14 |

(Continued)

FOREIGN PATENT DOCUMENTS

| JP | 3526025 B2 | 5/2004 |
| JP | 6456443 B2 | 1/2019 |
| KR | 0109367 Y1 | 4/1998 |

*Primary Examiner* — Daniel J Colilla
(74) *Attorney, Agent, or Firm* — MCDONNELL BOEHNEN HULBERT & BERGHOFF LLP

(57) ABSTRACT

A device for adjusting a position of a seat for a purpose built vehicle for mobility services allows a seatback to be mounted on an inner wall surface of a vehicle body in an adjustable manner. The device also includes a seat cushion fixed on a floor panel in an adjustable manner. The device is capable of adjusting the seat to various desired positions such as a storage position for cargo loading, a general seating position, a position of a comfortable posture for relaxation, a bed position, and the like.

14 Claims, 16 Drawing Sheets

(51) Int. Cl.
*A47C 9/06* (2006.01)
*B60N 2/015* (2006.01)
*B60N 2/16* (2006.01)
*B60N 2/90* (2018.01)
*B60N 2/34* (2006.01)

(58) Field of Classification Search
CPC .. B60N 2/34; A47C 9/06; A47C 17/48; A47C 1/126
See application file for complete search history.

(56) References Cited

U.S. PATENT DOCUMENTS

| | | |
|---|---|---|
| 6,742,841 B1 | 6/2004 | Soditch et al. |
| 10,464,679 B2 * | 11/2019 | Hoover .............. B64D 11/0698 |
| 2022/0144148 A1 * | 5/2022 | Kim .................... B60N 2/3065 |

* cited by examiner

DEVICE FOR ADJUSTING POSITION OF SEAT FOR VEHICLE

CROSS REFERENCE TO RELATED APPLICATIONS

The present application claims priority to Korean Patent Application No. 10-2021-0125498, filed Sep. 23, 2021, the entire contents of which is incorporated herein for all purposes by this reference.

BACKGROUND

Field

The present disclosure relates to a device for adjusting a position of a seat for a vehicle and, more particularly, to a device for adjusting a position of a seat for a vehicle, the device being capable of variously adjusting the position of a seat mounted on a purpose built vehicle for mobility services.

Description of the Related Art

In general, a seat of a car is manufactured to have a structure that includes a seat cushion for seating, a seatback allowing a back to be leaned on, a headrest to support a neck and head, and the like, and in addition to this, various mechanisms for adjusting a position of the seat are being applied to the seat so that a suitable change of the position of the seat may be freely implemented according to a body type and situation of a passenger.

For example, the various mechanisms for adjusting the position of the seat may include a mechanism for adjusting a height of the seat, a mechanism for implementing a comfortable posture for relaxation, a mechanism for reclining the seatback, and the like.

However, the various mechanisms for adjusting the position of the seat have disadvantages of being complex and having the number of parts excessively consumed, and problems such as a rise in assembly labor and cost and an increase of vehicle weight according to the application of the excessive number of parts follow.

Accordingly, a simplified mechanism is desired for adjusting the position of a seat.

In particular, a purpose built vehicle (PBV) for mobility services, a type of autonomous vehicle, is manufactured for various purposes such as living and resting spaces, mobile warehouses, mobility for logistics delivery, mobile hospitals, food trucks, and the like, so that the indoor space for mounting the seat is inevitably restricted. Therefore, applying the mechanism for adjusting the position of the seat, in a simplified structure suitable in association with the purpose of a purpose based vehicle for mobility services, may be a good option.

Moreover, when multiple seats for multiple passengers are mounted in the small indoor space of the purpose built vehicle for mobility services, a space behind the seatback may not be widely secured, so there is a limit in applying the mechanism for reclining the seatback, and there is a difficulty in adjusting a tilting angle of the seat cushion associated with being interlocked with reclining the seatback backward for implementing the comfortable posture for relaxation.

The foregoing is intended merely to aid in the understanding of the background of the present disclosure and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to provide a device for adjusting a position of a seat for a vehicle, wherein the device allows a seatback to be mounted on an inner wall surface of a vehicle body in a manner a position thereof is adjustable and a seat cushion to be fixed on a floor panel in a manner a position thereof is adjustable, thereby being capable of adjusting the seat to various desired positions such as a storage position for cargo loading, a general seating position, a position of a comfortable posture for relaxation, a bed position, and the like.

In order to achieve the above objective, according to one aspect of the present disclosure, there may be provided a device for adjusting a position of a seat for a vehicle, the device including a seatback and a seat cushion connected to each other so as to be rotatable, a leg part connected to be able to rotate to a front end portion of the seat cushion, a bracket for mounting mounted to be able to rotate on a rear surface portion of the seatback, a plurality of seatback mounting structures provided on an inner wall surface of a vehicle body in order for the bracket for mounting to be selectively mounted thereon in a detachable manner, and a plurality of leg part fixing grooves provided on a floor panel in order for the leg part to be selectively inserted thereinto in a detachable manner.

A lower end portion of the seatback and a rear end portion of the seat cushion may be connected to be able to rotate by a first hinge pin.

A front end portion of the seat cushion and an upper end portion of the leg part may be connected to be able to rotate by a second hinge pin.

The bracket for mounting may be mounted to be able to rotate on an upper end portion of the rear surface portion of the seatback by a third hinge pin.

The bracket for mounting may include a horizontal plate connected to the upper end portion of the rear surface portion of the seatback by the third hinge pin, and a vertical plate bent in a downward direction at a rear end portion of the horizontal plate.

The bracket for mounting may further include a mounting hole that is provided by penetrating the bracket for mounting and may allow a hook to be inserted thereinto to be locked.

The seatback mounting structure may include a plurality of mounting bars arranged and mounted at predetermined intervals along a vertical direction on the inner wall surface of a vehicle body.

Alternatively, the seatback mounting structure may include a plurality of fixing holes, arranged at predetermined intervals along a vertical direction and provided by penetrating the seatback mounting structure, on the inner wall surface of a vehicle body.

Alternatively, the seatback mounting structure may include a plurality of hooks arranged and mounted at predetermined intervals along a vertical direction on the inner wall surface of a vehicle body.

An accommodating groove part capable of accommodating the vertically deployed seatback, the seat cushion, and the leg part may be provided on the inner wall surface of a vehicle body.

The plurality of leg part fixing grooves may be provided to have predetermined intervals along left and right directions and a regular depth on the floor panel so that a lower end portion of the leg part may be selectively inserted thereinto.

A seating structure of flexible material may be connected between an upper end portion of the leg part and the bracket for mounting.

The seating structure of flexible material may include any one selected from fabric, leather, netting, and multiple hinge structures in which a plurality of rectangular plate bodies are connected to be able to be folded.

As described above, through means for solving the above problems, the present disclosure provides following effects.

First, it is possible to easily install a seat that can be adjusted to various desired positions such as a storage position for cargo loading, a general seating position, a position of comfortable posture for relaxation, a bed position, and the like, in a restricted and small indoor space of a purpose built vehicle (PBV) for mobility services.

Second, through a simple mechanism allowing a seatback to be mounted on an inner wall surface of a vehicle body in a manner a position thereof is adjustable and a seat cushion to be fixed on the floor panel in a manner a position thereof is adjustable, the device can adjust the seat to various desired positions such as the storage position for cargo loading, the general seating position, the position of comfortable posture for relaxation, the bed position, and the like, and cost and weight reduction and the like can be realized by simplifying the mechanism and reducing the number of parts.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

Hereinbelow, exemplary embodiments of the present disclosure will be described in detail with reference to the accompanying drawings.

As described above, a purpose built vehicle (PBV) for mobility services, a type of autonomous vehicle, is manufactured for various purposes such as living and resting space, mobile warehouses, a mobility for logistics delivery, mobile hospitals, food trucks, and the like, so the indoor space for mounting the seat is inevitably restricted. Accordingly, there is a problem in that there is a limit to an application of a complex mechanism for adjusting a seat position.

In order to solve the above problems, the present disclosure is intended to provide a simplified mechanism for adjusting a position of a seat, the mechanism being capable of adjusting the seat in a restricted small indoor space of a purpose built vehicle (PBV) for mobility services to various desired positions such as a storage position for cargo loading, a general seating position, a position of a comfortable posture for relaxation, a bed position, and the like.

Figure 1:
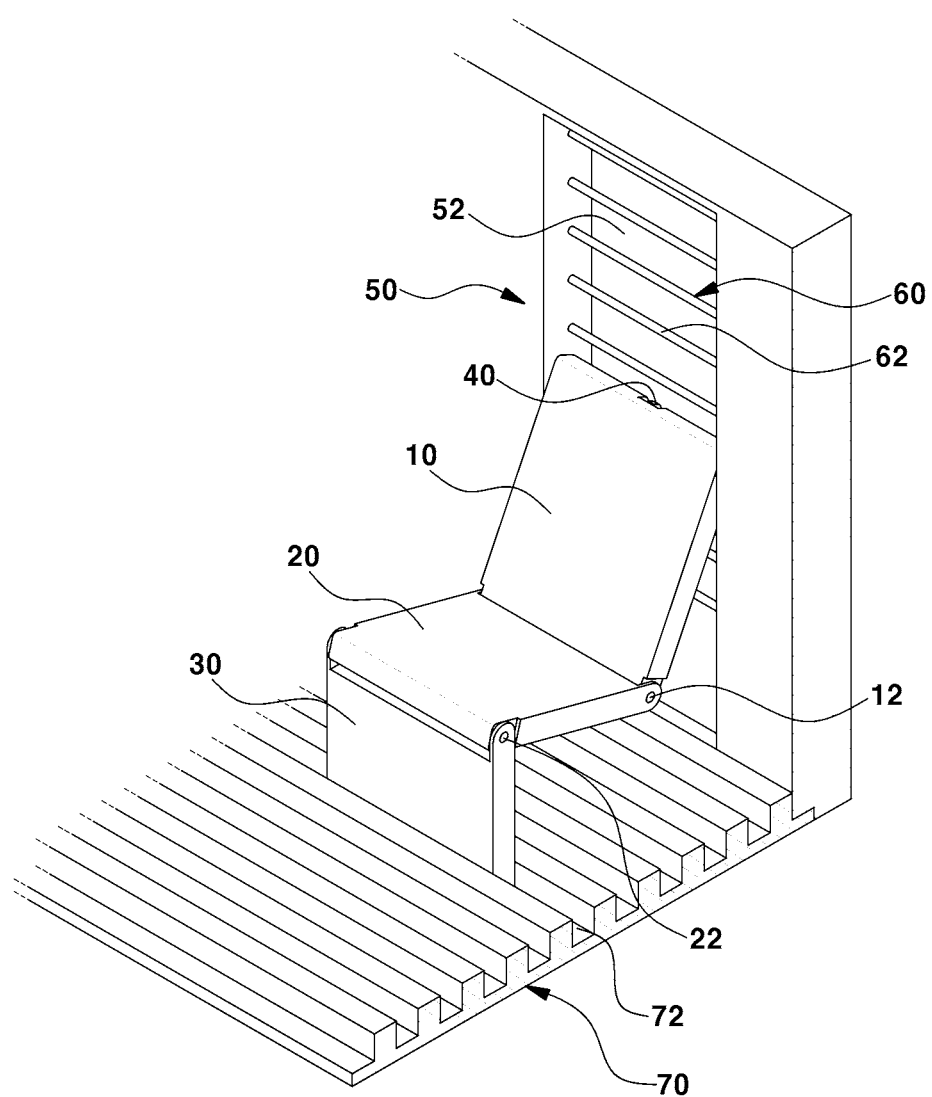
FIG. 1 is a perspective view showing a device for adjusting a position of a seat for a vehicle according to the present disclosure.
Figure 2:
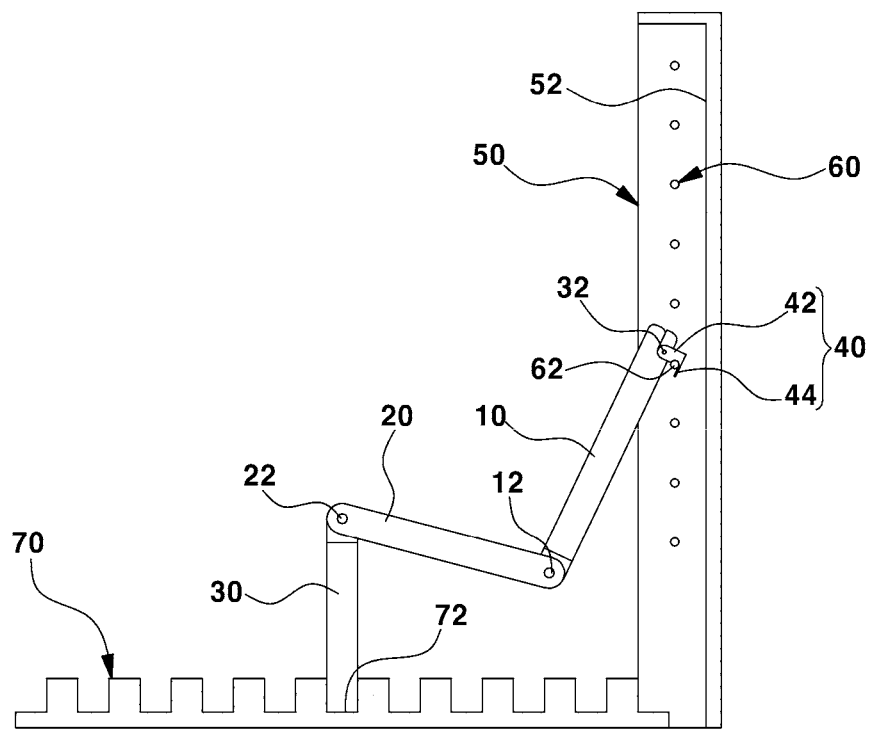
FIG. 2 is a side sectional view showing the device for adjusting a position of a seat for a vehicle according to the present disclosure.

Accompanying FIG. 1 is a perspective view showing a device for adjusting a position of a seat for a vehicle according to the present disclosure, and accompanying FIG. 2 is a side sectional view showing the device for adjusting a position of a seat for a vehicle according to the present disclosure.

As shown in FIGS. 1 and 2, a seatback 10 supporting a back and waist of a passenger and a seat cushion 20 supporting a lower body of a passenger are connected to each other so as to be rotatable.

For example, a lower end portion of the seatback 10 and a rear end portion of the seat cushion 20 are connected to be able to rotate by a first hinge pin 12.

A leg part 30 for supporting the seat cushion 20 on which a passenger may be in a posture of sitting, lying down, or the like is connected to be able to rotate to a front end portion of the seat cushion 20.

For example, a front end portion of the seat cushion 20 and an upper end portion of the leg part 30 are connected to be able to rotate by a second hinge pin 22.

A bracket 40 for mounting for fixing the seatback 10 at a desired angle is mounted to be able to rotate, on a rear surface portion of the seatback 10.

For example, the bracket 40 for mounting is mounted to be able to rotate by a third hinge pin 32 on an upper end portion of the rear surface portion of the seatback 10.

Here, the bracket 40 for mounting may include a horizontal plate 42 connected by the third hinge pin 32 to the upper end portion of the rear surface portion of the seatback 10 and a vertical plate 44 bent in a downward direction at a rear end portion of the horizontal plate 42.

On the other hand, a plurality of seatback mounting structures is provided on an inner wall surface of a vehicle body in order for the bracket for mounting to be selectively mounted and fixed thereon, in a detachable manner, and a plurality of leg part fixing grooves is provided on a floor panel in order for the leg part to be selectively inserted thereinto and fixed thereto, in a detachable manner.

The seatback mounting structure 60 according to an embodiment of the present disclosure may include a plurality of mounting bars 62 arranged and mounted at equal intervals along a vertical direction on the inner wall surface 50 of the vehicle body.

More specifically, an accommodating groove part 52, which is capable of accommodating the vertically deployed seatback 10, the seat cushion 20, and the leg part 30, is provided on the inner wall surface 50 of the vehicle body, so that the plurality of mounting bars 62 may be arranged at equal intervals in the vertical direction in the accommodating groove part 52 and, at the same time, opposite ends of each thereof may be mounted on opposite sides of the accommodating groove part 52. Consequently, the accommodating groove enters into a state capable of allowing the bracket 40 for mounting to be selectively mounted and fixed on each of the mounting bars 62, in a detachable manner.

The plurality of leg part fixing grooves 72 may have equal intervals along left and right directions and a predetermined depth on the floor panel 70 so that the lower end portion of the leg part 30 is selectively inserted thereinto.

Here, an operation example of the device for adjusting a position of a seat according to the present disclosure will be described as follows.

Figure 3A:
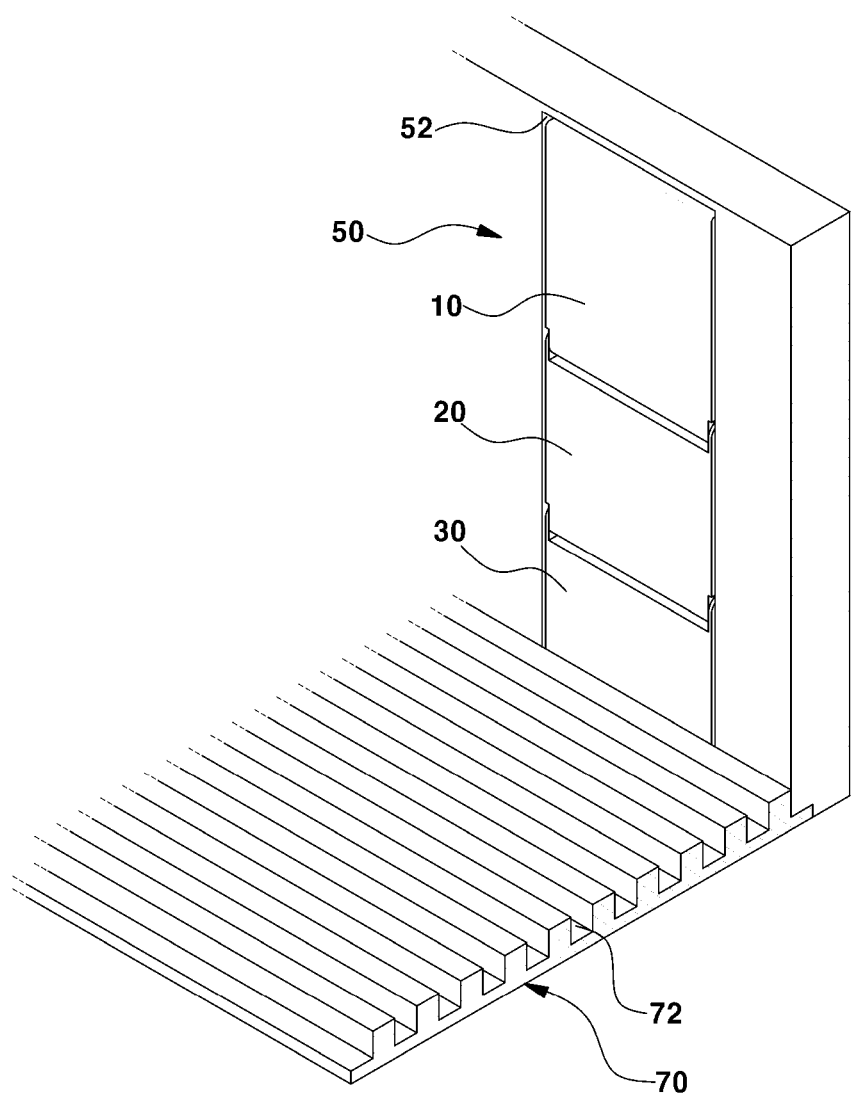
FIGS. 3A and 3B are a perspective view and a side view, respectively, showing a state in which the seat has been adjusted to a storage position by the device for adjusting a position of a seat for a vehicle according to the present disclosure.
Figure 3B:
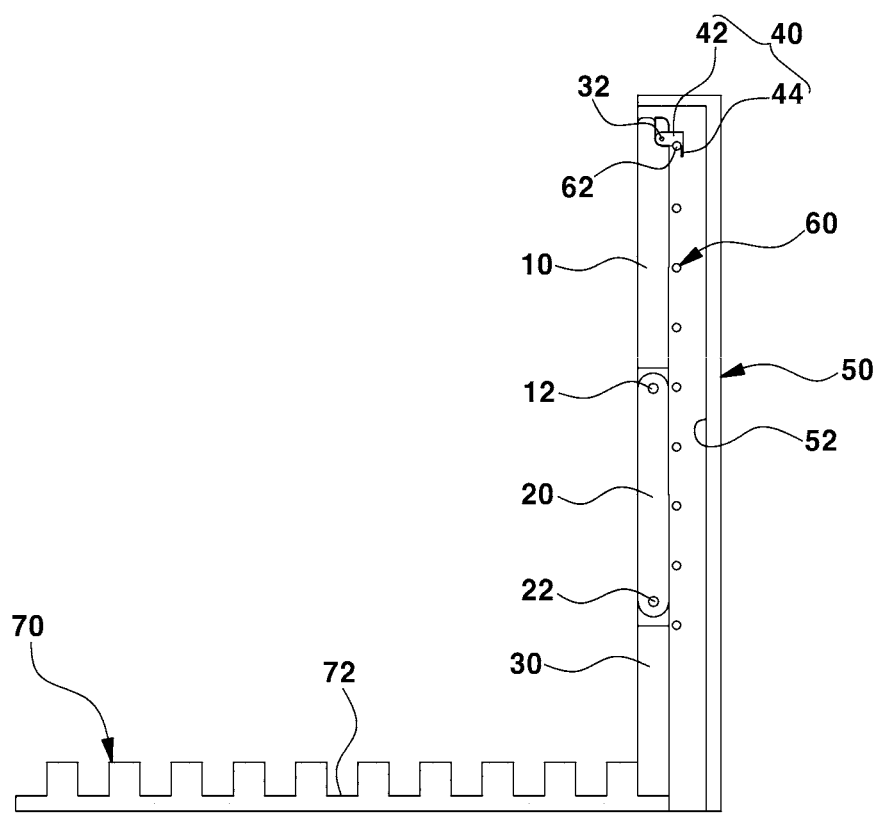

Accompanying FIGS. 3A and 3B are a perspective view and a side view, respectively, showing a state in which the seat has been adjusted to the storage position by the device for adjusting a position of a seat for a vehicle according to the present disclosure.

As shown in FIGS. 3A and 3B, in order for the seatback 10, the seat cushion 20, and the leg part 30 to be provided in a deployed state by being erected in a vertical direction, the seatback 10 and the seat cushion 20 are vertically deployed by being mutually rotated to each other with the first hinge pin 12 as a center, and the leg part 30 is vertically deployed by being rotated with the second hinge pin 22 as a center.

In addition, the bracket 40 for mounting mounted on the rear surface portion of the seatback 10 is fixed by being hooked on the mounting bar 62 which is located at an uppermost one of the plurality of mounting bars 62.

That is, when the horizontal plate 42 and the vertical plate 44 of the bracket 40 for mounting are hooked on the mounting bar 62 located at the uppermost portion, the horizontal plate 42 is brought into close contact with an upper side of the mounting bar 62 and, at the same time, the vertical plate 44 is arranged in the downward direction past the mounting bar 62, whereby the bracket 40 for mounting enters into a state of being fixed to the mounting bar 62 located at the uppermost portion.

Accordingly, the horizontal plate of the bracket 40 for mounting is in a state of being connected to the rear surface portion of the seatback 10, so the seatback 10, the seat cushion 20, and the leg part 30, which are in a state of being deployed by being erected in the vertical direction, enter into a state of being stored and located in the accommodating groove part 52 provided on the inner wall surface 50 of the vehicle body.

As described above, the seatback 10, the seat cushion 20, and the leg part 30 are stored and located in the accommodating groove part 52 provided on the inner wall surface 50 of the vehicle body, whereby the space on the floor panel 70 may be secured widely for cargo loading.

Figure 4A:
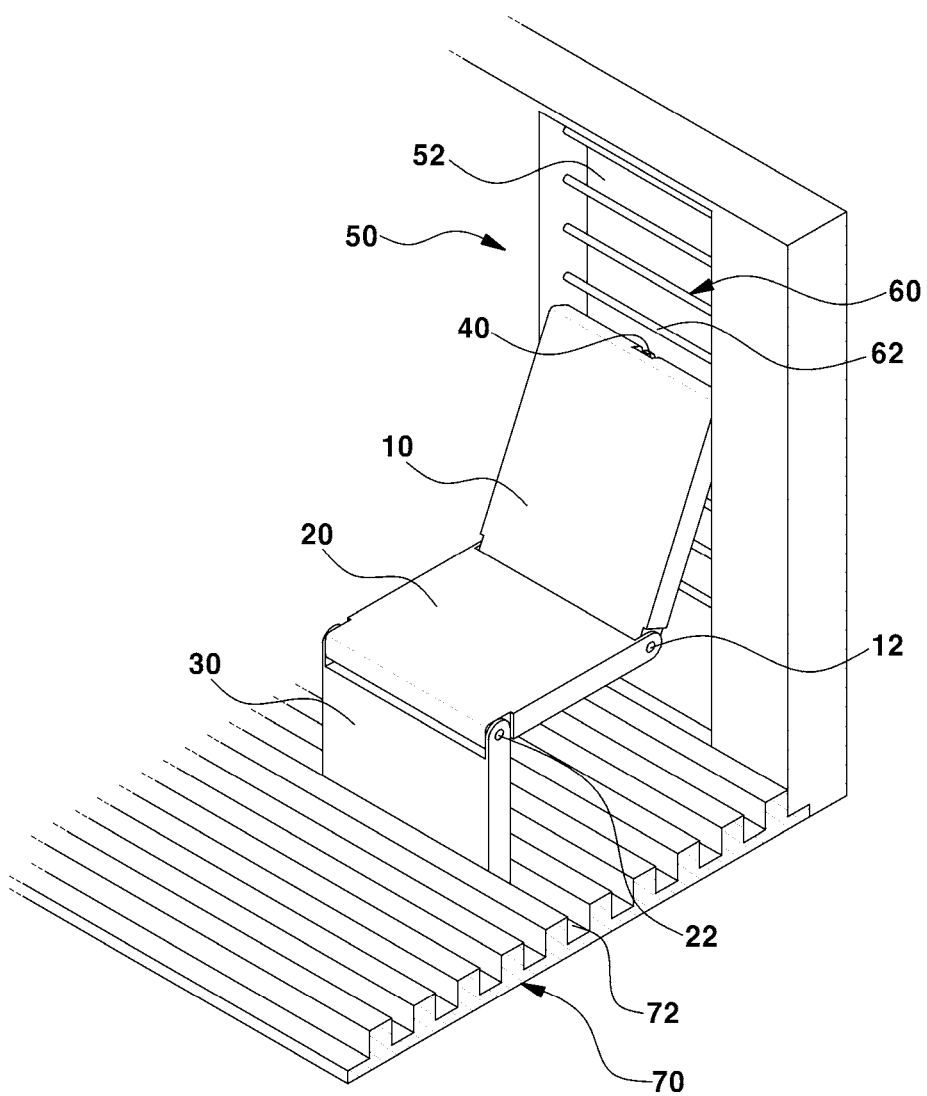
FIGS. 4A and 4B are a perspective view and a side view, respectively, showing a state in which the seat has been adjusted to a general seating position by the seat position adjusting device for a vehicle according to the present disclosure.
Figure 4B:
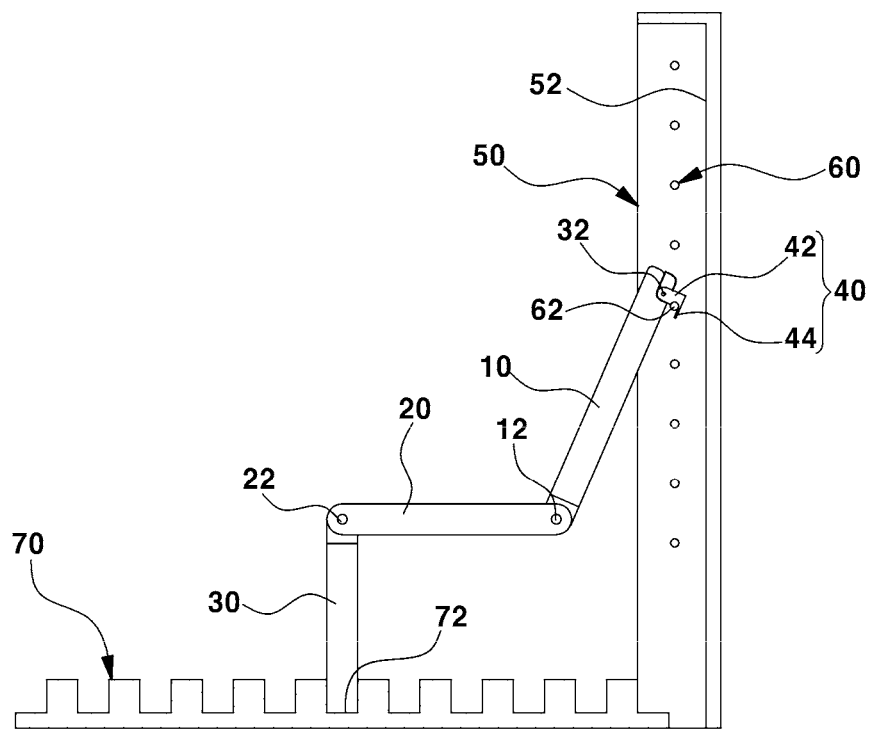

Accompanying FIGS. 4A and 4B are a perspective view and a side view, respectively, showing a state in which the seat has been adjusted to a general seating position by the seat position adjusting device for a vehicle according to the present disclosure.

As shown in FIGS. 4A and 4B, the bracket 40 for mounting mounted on the rear surface portion of the seatback 10 is fixed by being hooked on the supporting bar 62 located in about the middle of the plurality of supporting bars 62.

At this time, the horizontal plate 42 of the bracket 40 for mounting is in a state of being connected to the rear surface portion of the seatback 10 by the third hinge pin 32, so the seatback 10 is rotated with the third hinge pin 32 as the center, thereby being able to be arranged at a predetermined inclination at which an upper body of a passenger may be leaned.

In addition, the seat cushion 20 is rotated with the first hinge pin 12 as the center so as to be arranged at an inclination at which a lower body of the passenger may be seated.

Along with this, the leg part 30 is rotated in a downward direction with the second hinge pin 22 as the center, and then the lower end portion of the leg part 30 is inserted into and fixed to one of the plurality of leg part fixing grooves 72 provided on the floor panel 70.

Therefore, the seatback 10 is supported at a predetermined inclination at which the upper body of the passenger may be leaned by the bracket 40 for mounting, and at the same time, the seat cushion 20 enters into a state of being supported at the inclination at which the lower body of the passenger may be seated by the leg part 30, whereby the seat may be easily adjusted to a general seating position in which a passenger may be seated.

Figure 5A:
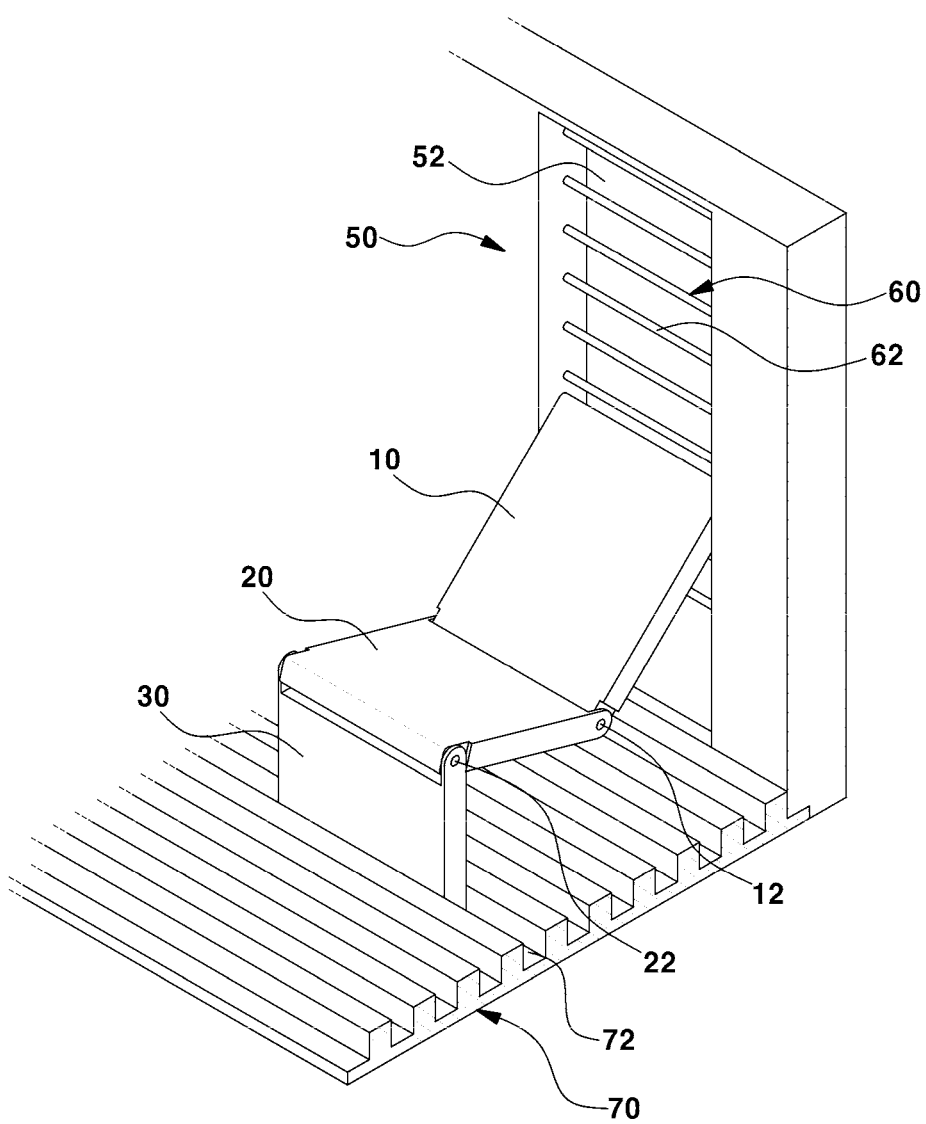
FIGS. 5A and 5B are a perspective view and a side view, respectively, showing a state in which the seat has been adjusted to a position of a comfortable posture for relaxation by the device for adjusting a position of a seat for a vehicle according to the present disclosure.
Figure 5B:
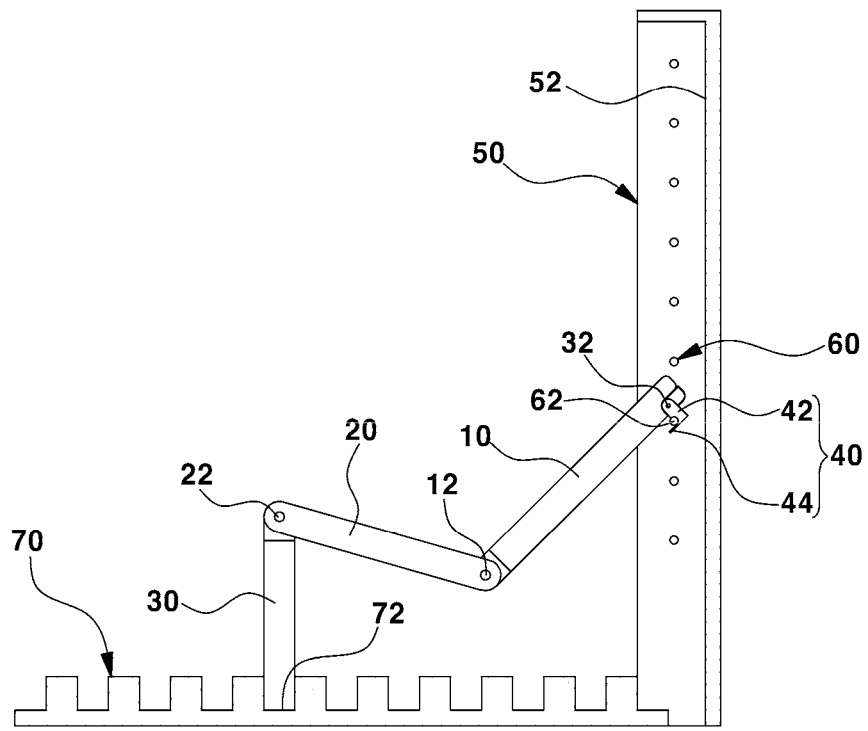

Accompanying FIGS. 5A and 5B are a perspective view and a side view, respectively, showing a state in which the seat has been adjusted to a position of a comfortable posture for relaxation by the device for adjusting a position of a seat for a vehicle according to the present disclosure.

As shown in FIGS. 5A and 5B, the bracket 40 for mounting mounted on the rear surface portion of the seatback 10 is hooked and fixed on the mounting bar 62 located below a middle one of the plurality of mounting bars 62.

At this time, the horizontal plate 42 of the bracket 40 for mounting is in a state of being connected to the rear surface portion of the seatback 10 by the third hinge pin 32, so the seatback 10 may be rotated with the third hinge pin 32 as the center to be arranged at a predetermined inclination so that the upper body of the passenger may be tipped backward to be leaned against the seatback 10.

In addition, the seat cushion 20 may be rotated with the first hinge pin 12 as the center so that the rear end portion of the seat cushion 20 may be arranged to have a lower height than the front end portion.

Along with this, the leg part 30 may be rotated in the downward direction with the second hinge pin 22 as the center, and then the lower end portion of the leg part 30 is inserted into one of the plurality of leg part fixing grooves 72 provided on the floor panel 70.

Accordingly, the seatback 10 is supported by the bracket 40 for mounting at a predetermined inclination on which the upper body of the passenger may be tipped backward to be leaned against the seatback 10, and at the same time, the seat cushion 20 enters into a state of being supported at an inclination such that the buttock portions are positioned lower than thigh portions of the passenger by the leg part 30, whereby the seat may be easily adjusted to the position of a comfortable posture for relaxation where the passenger may comfortably rest.

Figure 6A:
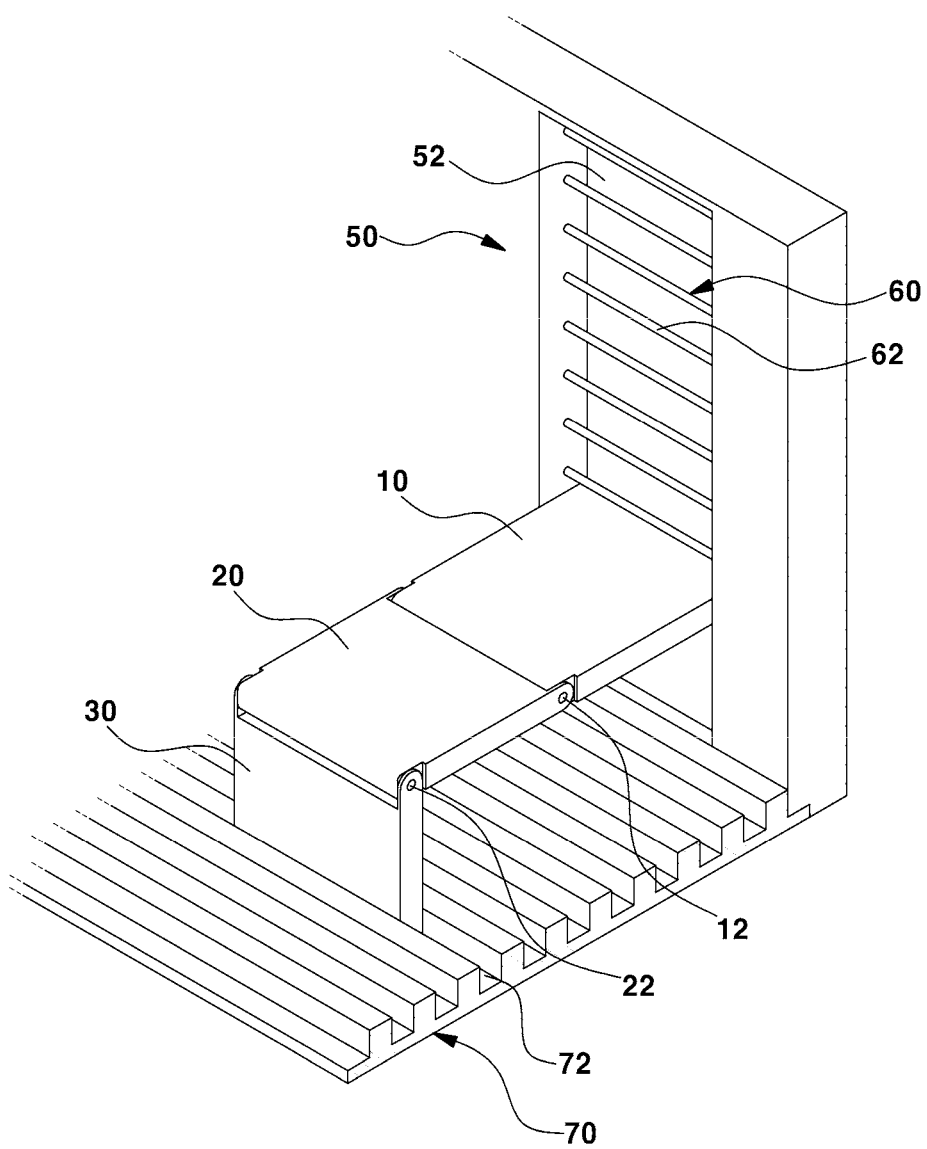
FIGS. 6A and 6B are a perspective view and a side view, respectively, showing a state in which the seat has been adjusted to a bed position by the device for adjusting a position of a seat for a vehicle according to the present disclosure.
Figure 6B:
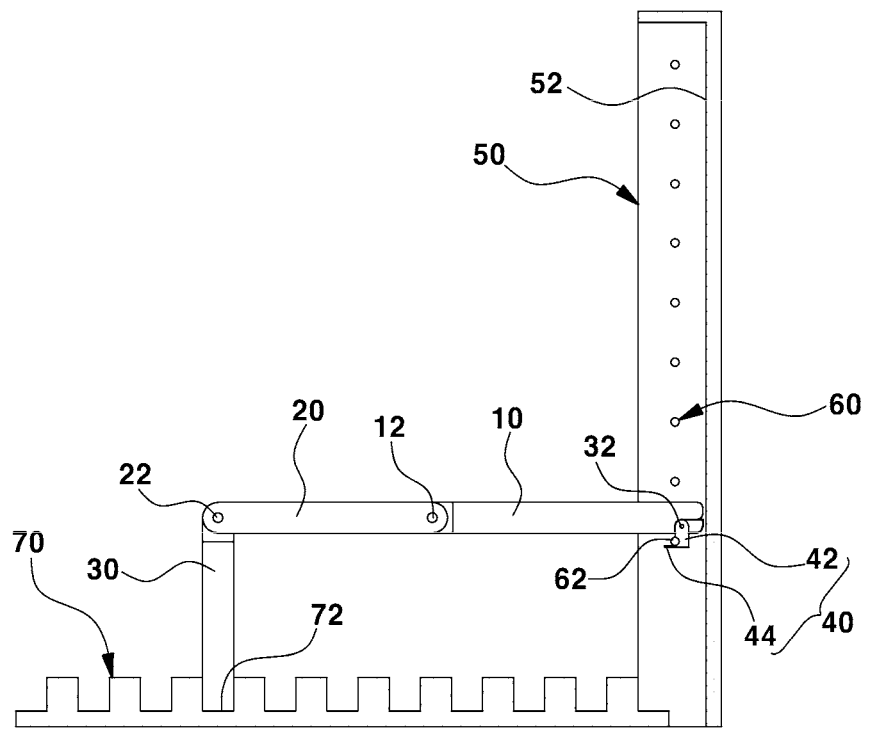

Accompanying FIGS. 6A and 6B are a perspective view and a side view, respectively, showing a state in which the seat has been adjusted to a bed position by the device for adjusting a position of a seat for a vehicle according to the present disclosure.

The bracket 40 for mounting mounted on the rear surface portion of the seatback 10 is fixed by being hooked on the mounting bar 62 which is located at a lowermost one of the plurality of mounting bars 62.

At this time, the horizontal plate 42 of the bracket 40 for mounting is in a state of being connected to the rear surface portion of the seatback 10 by the third hinge pin 32, so the seatback 10 is rotated with the third hinge pin 32 as the center, thereby being able to be arranged to be in a horizontal state.

In addition, the seat cushion 20 is rotated with the first hinge pin 12 as the center, thereby being able to be arranged to be in a horizontal state together with the seatback 10.

Along with this, the leg part 30 is rotated in the downward direction with the second hinge pin 22 as the center, and then the lower end portion of the leg part 30 is inserted into one, located farthest from the inner wall surface of the vehicle body, of the plurality of leg part fixing grooves 72 provided on the floor panel 70.

Accordingly, the seatback 10 is arranged in a horizontal state while being supported by the bracket 40 for mounting, and at the same time, the seat cushion 20 is arranged in a horizontal state while being supported by the leg part 30, whereby the seat may be easily adjusted to the position where the passenger may lie down.

In this way, the seat in the restricted and small indoor space of the purpose built vehicle (PBV) with mobility services may be easily adjusted to various desired positions such as the storage position for cargo loading, the general seating position, the position of a comfortable posture for relaxation, the bed position, and the like.

Figure 7A:
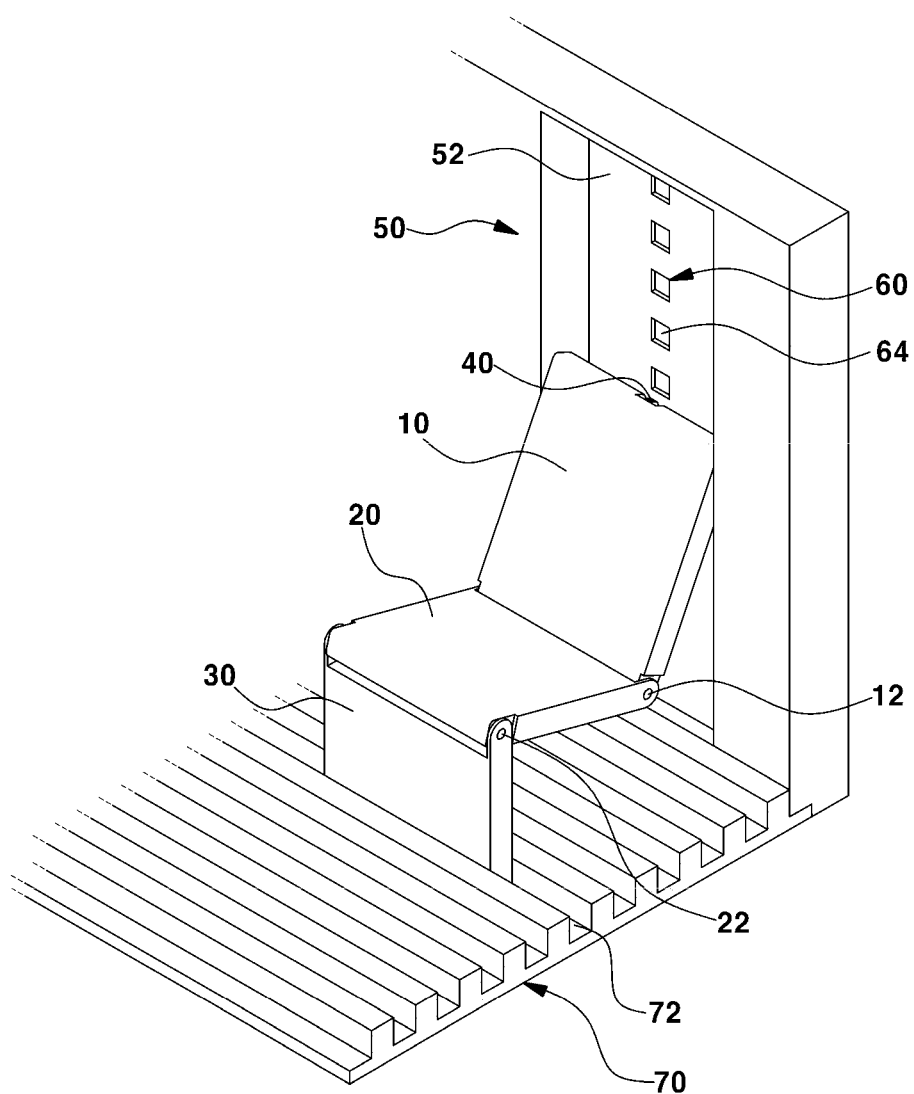
FIGS. 7A and 7B are each views showing another embodiment of a coupling structure between a bracket for mounting of a seatback and a wall surface of a vehicle body of a configuration of the device for adjusting a position of a seat for a vehicle according to the present disclosure.
Figure 7B:
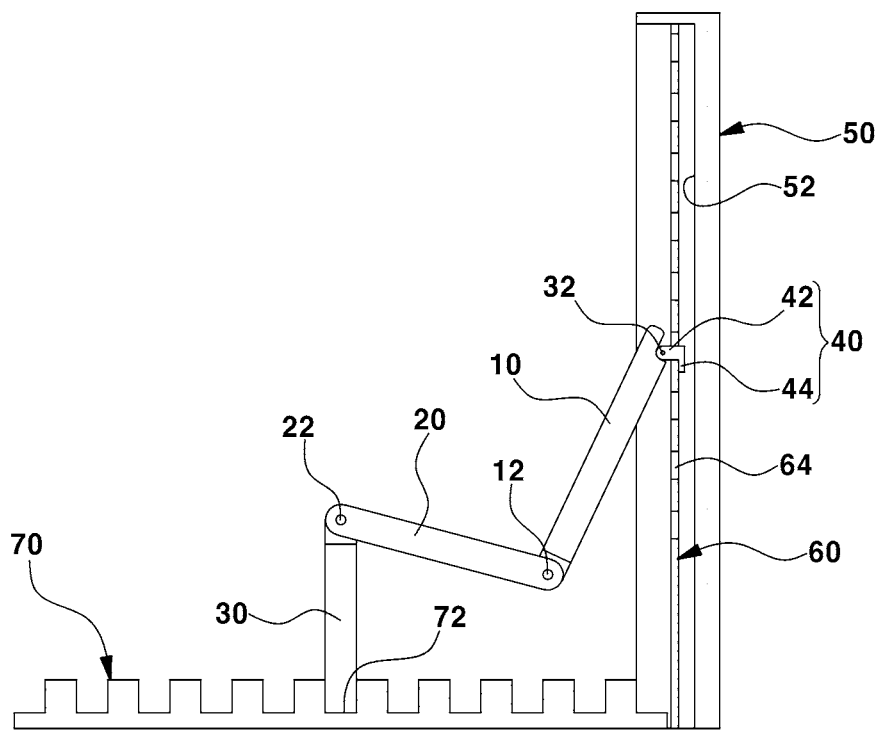

Accompanying FIGS. 7A and 7B are each views showing another embodiment of a coupling structure between a bracket for mounting of a seatback and a wall surface of a vehicle body of a configuration of the device for adjusting a position of a seat for a vehicle according to the present disclosure.

As shown in FIGS. 7A and 7B, the seatback mounting structure 60 according to the another embodiment of the present disclosure may include a plurality of fixing holes 64 which are arranged at equal intervals along the vertical direction on the inner wall surface 50 of the vehicle body and provided by penetrating through the seatback mounting structure.

Accordingly, the vertical plate 44 of the bracket 40 for mounting is inserted into the fixing hole 64 and then arranged in the downward direction, whereby the bracket 40 for mounting may be easily fixed to the fixing hole 64, and the seatback 10 may be easily supported and fixed by the bracket 40 for mounting.

Figure 8A:
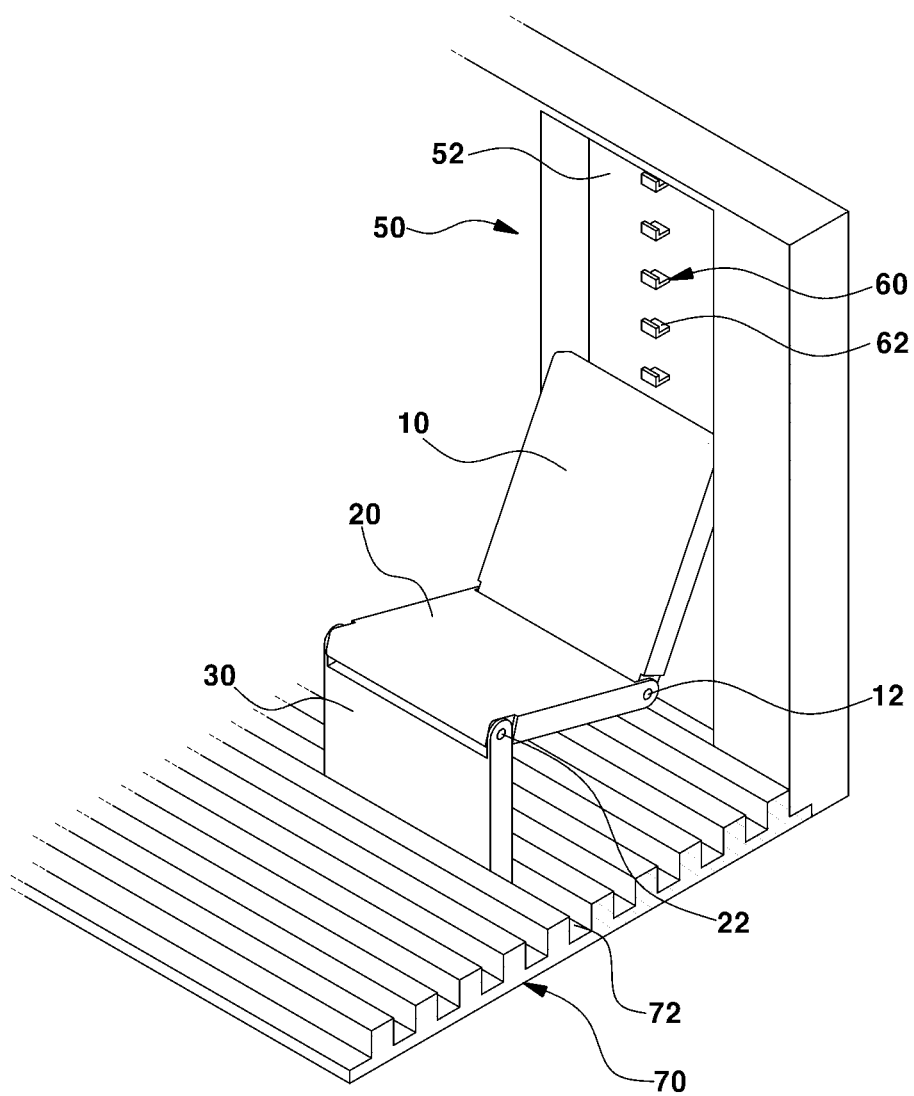
FIGS. 8A and 8B are each views showing still another embodiment of the coupling structure between a bracket for mounting of the seatback and the wall surface of a vehicle body of the configuration of the device for adjusting a position of a seat for a vehicle according to the present disclosure.
Figure 8B:
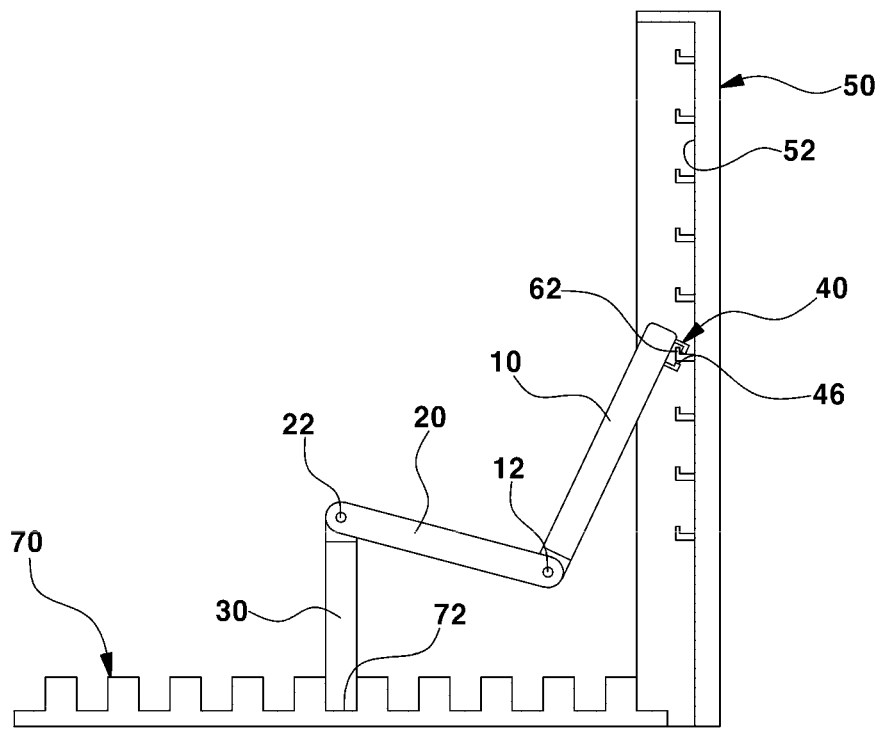

Accompanying FIGS. 8A and 8B are each views showing still another embodiment of the coupling structure between a bracket for mounting of the seatback and the wall surface of a vehicle body of the configuration of the device for adjusting a position of a seat for a vehicle according to the present disclosure.

As shown in FIGS. 8A and 8B, the seatback mounting structure 60 according to the still another embodiment of the present disclosure may include a plurality of hooks 66 which are arranged at equal intervals along the vertical direction on the inner wall surface 50 of the vehicle body and mounted on the seatback mounting structure.

At this time, the bracket 40 for mounting is provided with a mounting hole 46 by penetrating therethrough for coupling with a hook 66.

Accordingly, the hook 66 may be inserted through the mounting hole 46 provided in the bracket 40 for mounting, whereby the bracket 40 for mounting may be easily fixed by the hook 66, and the seatback 10 may be easily supported and fixed by the bracket 40 for mounting.

Meanwhile, a seating structure 80 of flexible material may be used instead of the seatback 10 and the seat cushion 20.

Figure 9A:
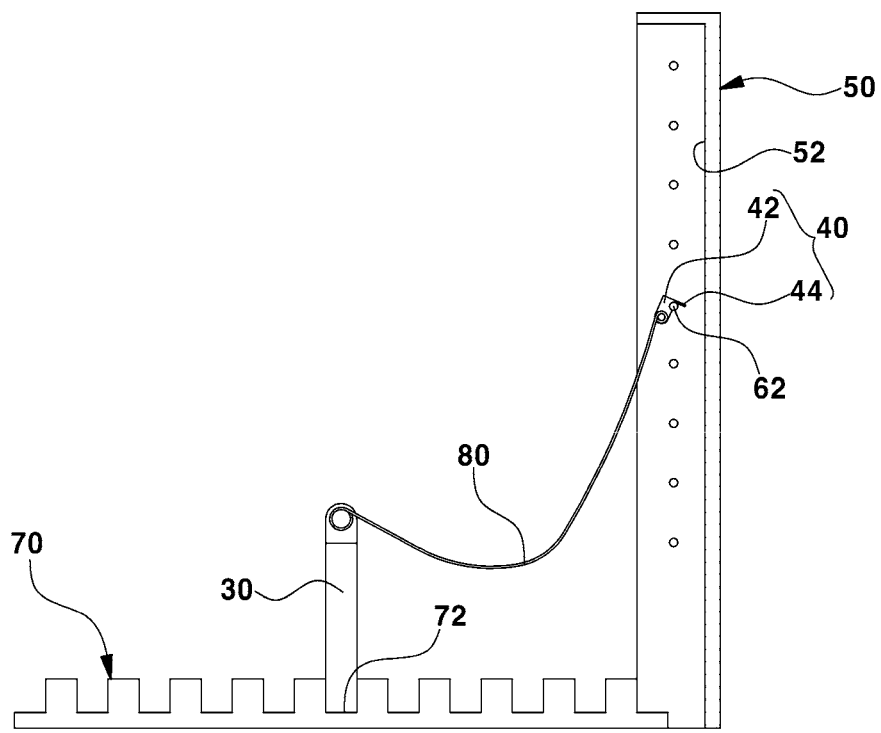
FIGS. 9A and 9B are each side sectional views showing an embodiment of a seating structure capable of replacing the seatback and a seat cushion of the configuration of the device for adjusting a position of a seat for a vehicle according to the present disclosure.
Figure 9B:
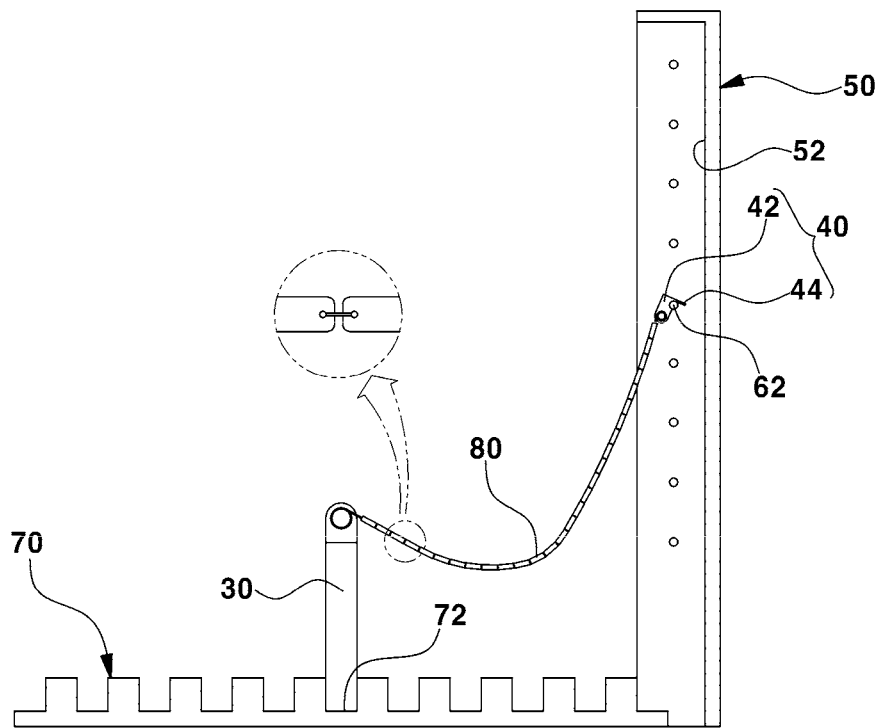

Accompanying FIGS. 9A and 9B are each side sectional views showing an embodiment of a seating structure capable of replacing the seatback and a seat cushion of the configuration of the device for adjusting a position of a seat for a vehicle according to the present disclosure.

As shown in FIG. 9A, the seating structure 80 of flexible material such as a hammock may be connected between the upper end portion of the leg part 30 and the bracket 40 for mounting, and the seating structure 80 of flexible material may use fabric, leather, netting, and the like.

As shown in FIG. 9B, the multiple hinge structures in which a plurality of rectangular plate bodies are connected to be able to be folded, as the seating structure 80 of flexible material, may be connected between the upper end portion of the leg part 30 and the bracket 40 for mounting.

In this way, the seating structure 80 of flexible material is applied as the structure for seating capable of replacing the seatback and the seat cushion, whereby it is possible to achieve weight and cost reduction.

Although exemplary embodiments of the present disclosure have been described for illustrative purposes, those skilled in the art will appreciate that various modifications, additions, and substitutions are possible, without departing from the scope and spirit of the disclosure as disclosed in the accompanying claims.

The invention claimed is:

1. A device for adjusting a position of a seat for a vehicle, the device comprising:
    a seatback rotatably connected to a seat cushion;
    a leg part rotatably connected to a front end portion of the seat cushion;
    a mounting bracket rotatably mounted on a rear surface portion of the seatback;
    a plurality of seatback mounting structures provided on an inner wall surface of a vehicle body to allow the mounting bracket to be mounted in a detachable manner; and
    a plurality of leg part fixing grooves provided on a floor panel to allow the leg part to be inserted into the plurality of leg part fixing grooves in a detachable manner.

2. The device of claim 1, wherein a lower end portion of the seatback and a rear end portion of the seat cushion are rotatably connected by a first hinge pin.

3. The device of claim 1, wherein a front end portion of the seat cushion and an upper end portion of the leg part are rotatably connected by a second hinge pin.

4. The device of claim 1, wherein the mounting bracket is rotatably mounted on an upper end portion of the rear surface portion of the seatback by a third hinge pin.

5. The device of claim 4, wherein the mounting bracket comprises:
    a horizontal plate connected to the upper end portion of the rear surface portion of the seatback by the third hinge pin; and
    a vertical plate bent in a downward direction at a rear end portion of the horizontal plate.

6. The device of claim 5, wherein the mounting bracket further comprises a mounting hole configured to allow a hook to be inserted into the mounting hole to be locked.

7. The device of claim 1, wherein the seatback mounting structure comprises a plurality of mounting bars arranged and mounted at predetermined intervals along a vertical direction on the inner wall surface of the vehicle body.

8. The device of claim 1, wherein the seatback mounting structure comprises a plurality of fixing holes arranged at predetermined intervals along a vertical direction, and penetrating the seatback mounting structure on the inner wall surface of the vehicle body.

9. The device of claim 1, wherein the seatback mounting structure comprises a plurality of hooks arranged and mounted at predetermined intervals along a vertical direction on the inner wall surface of the vehicle body.

10. The device of claim 1, wherein the inner wall surface of the vehicle body includes an accommodating groove part configured to accommodate the vertically deployed seatback, the seat cushion, and the leg part.

11. The device of claim 1, wherein the plurality of leg part fixing grooves includes a plurality of predetermined intervals along left and right directions, and a regular depth on the floor panel so that a lower end portion of the leg part is inserted into one of the plurality of predetermined intervals.

12. The device of claim 11, wherein the plurality of leg part fixing grooves has equal intervals along the left and right directions on the floor panel and a regular depth.

13. The device of claim 1, wherein a seating structure of flexible material is connected between an upper end portion of the leg part and the mounting bracket.

14. The device of claim 13, wherein the flexible material comprises any one selected from fabric, leather, netting, and multiple hinge structures in which a plurality of rectangular plate bodies are connected to be able to be folded.

* * * * *